United States Patent
Lee et al.

(10) Patent No.: US 9,532,074 B2
(45) Date of Patent: Dec. 27, 2016

(54) METHOD AND SYSTEM FOR VIDEO CODING SYSTEM WITH LOOP FILTERING

(75) Inventors: Kun-Bin Lee, Taipei (TW); Tung-Hsing Wu, Chiayi (TW); Yu Kun Lin, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 452 days.

(21) Appl. No.: 13/281,437

(22) Filed: Oct. 26, 2011

(65) Prior Publication Data

US 2013/0107947 A1     May 2, 2013

(51) Int. Cl.
*H04N 19/117* (2014.01)
*H04N 19/82* (2014.01)
*H04N 19/172* (2014.01)
*H04N 19/154* (2014.01)
*H04N 19/174* (2014.01)

(52) U.S. Cl.
CPC ............ *H04N 19/82* (2014.11); *H04N 19/117* (2014.11); *H04N 19/154* (2014.11); *H04N 19/172* (2014.11); *H04N 19/174* (2014.11)

(58) Field of Classification Search
CPC .................................. H04N 7/26; H04N 19/82
USPC .................................................... 375/240.05
See application file for complete search history.

(56) References Cited

U.S. PATENT DOCUMENTS

| 7,453,938 | B2 * | 11/2008 | Haskell | H04N 19/159 375/240.03 |
| 7,869,503 | B2 * | 1/2011 | Haskell | H04N 19/159 375/240.01 |
| 7,986,731 | B2 * | 7/2011 | Haskell | H04N 19/172 375/240.03 |
| 8,638,863 | B1 * | 1/2014 | Bankoski | H04N 19/176 375/240.29 |
| 8,781,004 | B1 * | 7/2014 | Bankoski | H04N 19/176 375/240.29 |
| 9,001,883 | B2 * | 4/2015 | Tsai | H04N 19/136 375/240 |
| 2008/0137753 | A1 * | 6/2008 | He | H04N 19/139 375/240.24 |
| 2010/0061444 | A1 * | 3/2010 | Wilkins | H04N 19/00006 375/240.02 |

(Continued)

OTHER PUBLICATIONS

Google On2, "VP8 Data Format and Decoding Guide", WebM Project, Feb. 4, 2011, pp. 1-105.

*Primary Examiner* — Jay Au Patel
*Assistant Examiner* — Irfan Habib
(74) *Attorney, Agent, or Firm* — Winston Hsu; Scott Margo (57) ABSTRACT

A method and apparatus for encoding of video data incorporating loop filtering are disclosed. The method and apparatus according to an embodiment of the present invention determines an initial loop filter level for a frame of the video data according to quality setting of the frame. The information associated with the initial loop filter level is incorporated in the bitstream corresponding to compressed video data. The loop filtering is applied to a macroblock without the need to wait for the whole frame reconstruction to complete. In another embodiment according to the present invention, the initial loop filter level may be refined according to stability associated with the frame. In yet another embodiment according to the present invention, the method may include determining whether segment mode is on or off and determining a frame-level or segment-level initial loop filter level accordingly.

21 Claims, 6 Drawing Sheets

(56) References Cited

U.S. PATENT DOCUMENTS

| | | | | |
|---|---|---|---|---|
| 2010/0061645 A1* | 3/2010 | Wilkins | ............... | H04N 19/50 |
| | | | | 382/238 |
| 2010/0074329 A1* | 3/2010 | Fu | ...................... | H04N 19/147 |
| | | | | 375/240.12 |
| 2010/0074330 A1* | 3/2010 | Fu | ...................... | H04N 19/147 |
| | | | | 375/240.12 |
| 2011/0235715 A1* | 9/2011 | Chien | ................ | H04N 19/176 |
| | | | | 375/240.16 |
| 2012/0177104 A1* | 7/2012 | Budagavi | ............ | H04N 19/176 |
| | | | | 375/240.02 |
| 2012/0195367 A1* | 8/2012 | Kossentini | .......... | H04N 19/147 |
| | | | | 375/240.02 |
| 2012/0250772 A1* | 10/2012 | Gao | .................... | H04N 19/159 |
| | | | | 375/240.24 |
| 2012/0275502 A1* | 11/2012 | Hsieh | ................ | H04N 19/159 |
| | | | | 375/224 |
| 2013/0003871 A1* | 1/2013 | Bjontegaard | ....... | H04N 19/176 |
| | | | | 375/240.29 |

* cited by examiner

```
if( frame_index <= 30 )                                          ⎫
    loop_filter_level /= 2;                                       ⎬ Before QP is stable
else if( frame_index % 30 == 0 ) {                                ⎭
    if   ( frame_QP < 32 )                    ⎫
        loop_filter_level -= 5;                │
    else if( frame_QP < 64 )                   │
        loop_filter_level -= 4;                ⎬ Decreasing filter strength
    else if( frame_QP < 96 )                   │  regularly to prevent blurring
        loop_filter_level -= 3;                │
    else                                       │
        loop_filter_level -= 2;                ⎭
}
loop_filter_level = (loop_filter_level<1)? 1 : loop_filter_level
```

METHOD AND SYSTEM FOR VIDEO CODING SYSTEM WITH LOOP FILTERING

FIELD OF THE INVENTION

The present invention relates to video encoding system. In particular, the present invention relates to video coding system with loop filtering.

BACKGROUND

Motion compensated inter-frame coding has been widely adopted in various coding standards, such as MPEG-1/2/4 and H.261/H.263/H.264/AVC. VP8 is a recent motion compensated video codec (encoder-decoder) being adapted for some software, hardware, platform and publish environments. The VP8 coding algorithm is similar to H.264 Baseline Profile. However, VP8 is tailored to simplify encoding and decoding complexity while delivering about the same performance as the H.264 Baseline Profile. During compression process, coding noises may arise due to lossy operations applied such as quantization. The coding artifacts may become noticeable in the reconstructed video data, especially at or near block boundaries. In order to alleviate the visibility of coding artifacts, a technique called in-loop filter has been used in newer coding systems such as H.264/AVC and VP8. The in-loop filter process applies filtering across block boundaries to smooth large transitions at and near block boundaries caused by coding noises while retaining image sharpness. Therefore, the in-loop filter process is often referred to as de-blocking, de-block filtering or loop filtering.

As mentioned above, in-loop filtering is used to alleviate the coding artifacts which are more visible at or around block boundaries. Therefore, heavier filtering is applied to block boundaries that suffer more severe block boundary distortion. Furthermore, a loop filter level is often selected for the frame according to a system performance criterion, such as the maxim PSNR (peak signal to noise ratio). In conventional encoding system such as VP8, the loop filter level for the frame is iteratively determined by trying out all filter candidates and selecting one achieving the maximum PSNR. In order to reduce required computations, the iterative process is often performed on a partial frame. Nevertheless, the iterative loop filter level determination still requires substantial computations and results in a great amount of data access. Furthermore, the iterative loop filter level determination also causes long latency in encoding process. Therefore, it is desirable to develop a method and system that can determine the loop filter level without iterative process.

BRIEF SUMMARY OF THE INVENTION

A method and apparatus for encoding of video data are disclosed. In one embodiment according to the present invention, the method and apparatus for encoding of video data comprise determining an initial loop filter level for a frame of the video data according to quality setting of the frame; incorporating information associated with the initial loop filter level in a bitstream corresponding to compressed video data; applying loop filtering to at least a part of reconstructed frame to generate restored video data; and generating a reference frame based on the restored video data. The quality setting may be related to one or more system parameters selected from a first group consisting of quantization parameter (QP), target bit rate per macroblock (MB), target bit rate, frame width, frame height, and frame type. Said determining the initial loop filter level may determine at least one filter parameter selected from a second group consisting of loop_filter_level and sharpness_level. The loop filtering may be applied to a reconstructed macroblock (MB) when a partial reconstructed frame including the macroblock is available. Said information associated with the initial loop filter level may comprise one or more filter parameters selected from a second group consisting of filter_type, loop_filter_level, and sharpness_level.

In another embodiment according to the present invention, the method and apparatus for encoding of video data comprise determining a frame-level initial loop filter level for a frame of the video sequence according to quality setting of the frame, wherein the frame-level initial loop filter level is used as initial loop filter level and the initial loop filter level is refined according to stability associated with the frame; incorporating information associated with the initial loop filter level in a bitstream corresponding to compressed video data; applying loop filtering to at least a part of reconstructed frame to generate restored video data; and generating a reference frame based on the restored video data. The initial loop filter level may be determined according to quantization parameter (QP). The frame-level initial loop filter level may be reduced if the frame is in first N frames of the video sequence, where N is a positive integer. The frame-level initial loop filter level may be periodically reduced according to a range of the QP after the first N frames. Furthermore, the method and apparatus for encoding of video data may further comprise determining whether segmentation is on, wherein a segment-level initial loop filter level is determined for each of segments of the frame according to quality setting for said each of the segments if the segmentation is on, and wherein the segment-level initial loop filter level is used as the initial loop filter level.

In yet another embodiment according to the present invention, the method and apparatus for encoding of video data comprise means for determining whether segmentation is on or off; means for determining a frame-level initial loop filter level for a frame of the video sequence according to first quality setting of the frame if segmentation is off, wherein the frame-level initial loop filter level is used as initial loop filter level; means for determining a segment-level initial loop filter level for each of segments of the frame according to second quality setting for the segment if the segmentation is on, wherein the segment-level initial loop filter level is used as initial loop filter level; means for incorporating information associated with the initial loop filter level in a bitstream corresponding to compressed video data; means for applying loop filtering to at least a part of reconstructed frame to generate restored video data; and means for generating a reference frame according to the restored video data.

DETAILED DESCRIPTION OF THE INVENTION

Motion compensated inter-frame coding has been widely adopted in various coding standards, such as MPEG-1/2/4 and H.261/H.263/H.264/AVC. VP8 is a recent motion compensated video codec (encoder-decoder) being adapted for some software, hardware, platform and publish environments. The VP8 coding algorithm is similar to H.264 Baseline Profile. However, VP8 is tailored to simplify encoding and decoding complexity while delivering about the same performance as the H.264 Baseline Profile.

Figure 1:
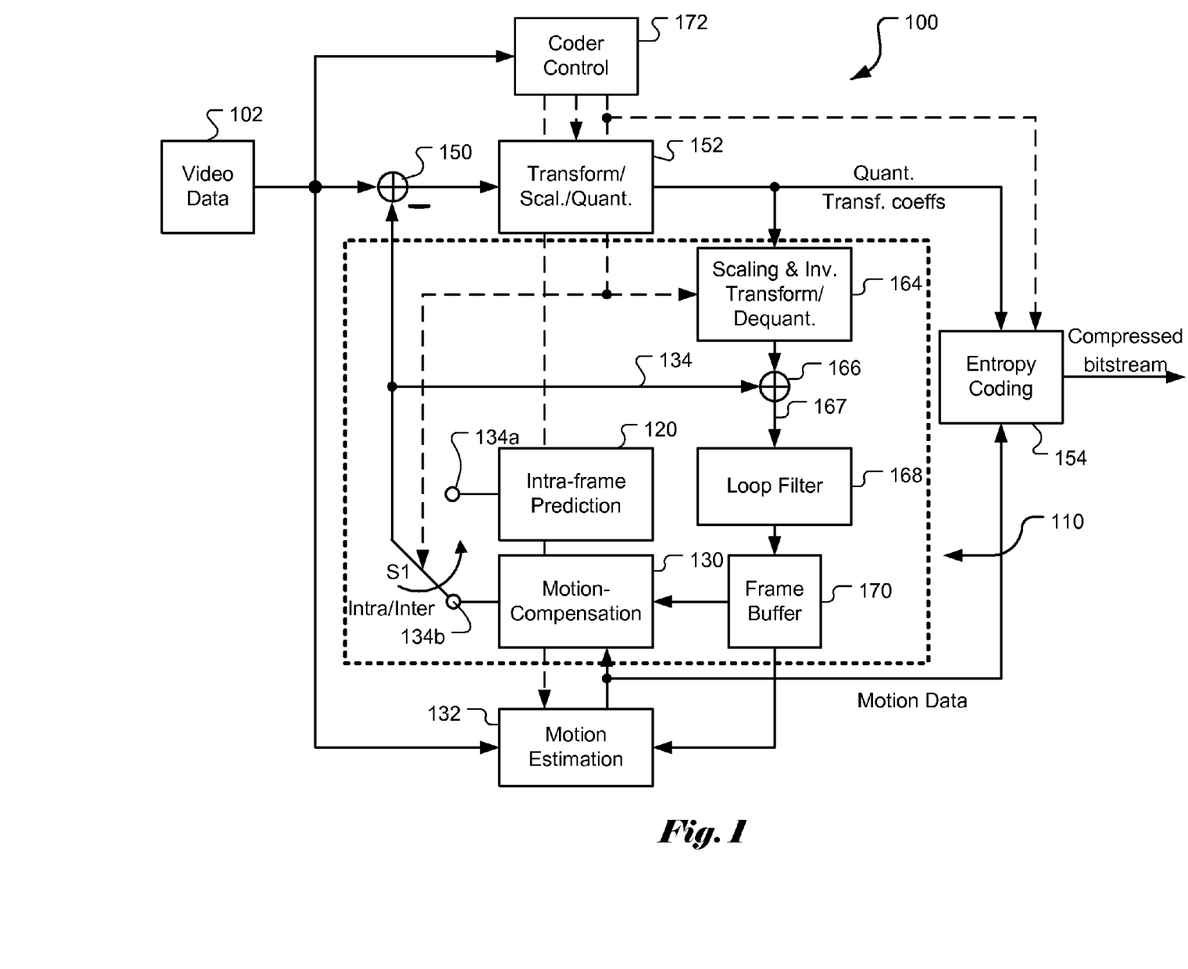
FIG. 1 illustrates an exemplary system block diagram for a video encoder using intra/inter prediction, where loop filtering is used to improve video quality.

FIG. 1 illustrates an exemplary motion-compensated encoding system 100 which can select between Intra and Inter prediction modes according to switch S1 position. The input video data 102 often are represented in color components, such as luminance Y and chrominance Cb (also called U) and Cr (also called V). The encoding system 100 includes a local decoder 110 to reconstruct reference data needed for Intra and Inter prediction. Intra-prediction 120 is responsible for providing prediction data based on reconstructed video data in the same frame. For inter-prediction, motion estimation (ME) 132 and motion compensation (MC) 130 are used to provide prediction data based on previously reconstructed frame or frames. Switch S1 selects intra-prediction by selecting node 134a or inter-prediction by selecting node 134b and the selected prediction data are supplied to adder 150 to form prediction error, also called residue. The prediction error is then processed by transformation, scaling and quantization 152. The quantized transform coefficients corresponding to residues are then coded by entropy coding 154 to form a part of compressed bitstream corresponding to the transform coefficients. Information associated with motion data is also processed by entropy coding 154 and incorporated in the compressed bitstream. Other side information may also be processed by entropy coding to reduce required bandwidth and incorporated in the compressed bitstream. In order to reconstruct the reference frame/blocks at the encoder end, scaling, inverse transform and de-quantization 164 is used to recover the residues. The residues are then added back to prediction data from intra/inter-prediction 134 using adder 166 to form reconstructed video data 167. The reconstructed video data may suffer coding artifacts which are more prominent around block boundaries. Therefore, deblocking filter or loop filter 168 is applied to the reconstructed video data before the video data are stored in the frame buffer 170 in order to improve video quality. The video output from loop filter 168 is referred to as restored video data in this disclosure. The restored video is provided to frame buffer 170 and will be used as reference picture/frame for encoding of subsequent video data. The encoder system 100 also includes a coder control 172 to provide control signals to select between Intra and Inter modes, to select parameters for scaling and quantization, and to make decision for motion estimation 132.

As shown in FIG. 1, reconstructed video data 167 is further processed by loop filter 168 before it is buffered in frame buffer 170. VP8, like many other video coding standards, is block-based processing, where motion estimation and transformation are applied to macroblocks or blocks. Furthermore, the encoding process often involves lossy operations such as quantization of transformed coefficients. The lossy operations will result in distortion in the reconstructed video data and the impairments may be visible. Due to the block-based processing in the coding system, the impairments may be visible particularly at or around block boundaries. A technique used in H.264/AVC as well as VP8 applies filtering across block boundaries adaptively. Such filtering technique is referred to as de-blocking, or de-blocking filtering since it alleviates the artifacts particularly around block boundaries. Such filtering technique is also referred to as loop filtering, in-loop filtering, adaptive loop filtering or adaptive in-loop filtering since the filtering is applied within the reconstruction loop. VP8 also supports a method of implicit segmentation where different loop filter strengths can be applied for different parts of the image, according to the prediction mode or reference frames used to encode each macroblock. For example it would be possible to apply stronger filtering to intra-coded blocks. The choice of loop filter strengths is adjustable on a frame-by-frame basis. In addition, VP8 also supports refinement of loop filter strength for each macroblock and sub-macroblock. Furthermore, the encoder can adjust the filtering strength based on content. For example, strong filtering may be applied to areas with high motion and slight filtering may be applied to areas with low motion. Furthermore, in static areas, no filtering may be needed at all.

In video coding system, loop filtering may be adjusted in different levels such as sequence level, frame level and macroblock level. For sequence level adjustment, the loop filter parameters may be set once for a group of frames. In VP8, a frame level adjustment is used. In order to determine the best loop filter parameters, different loop filters are iteratively evaluated and a best one is selected. For each candidate loop filter, the restored video data are generated by applying the candidate filter to the reconstructed video data to generate the de-blocked video data, also called restored video data. The restored video data is further used as reference frame for coding the next frames. The quality of the restored video data is evaluated and the candidate filter that leads to the best performance is selected. The selected loop filter is applied to the reconstructed video data to generate the restored video data. When the frame-level loop filter is determined, local adjustment is allowed at the macroblock level according to local characteristics. For example, VP8 allows classification of a macroblock at the sub-block or sub-macroblock level (4×4 pixels) according to motion information associated with the sub-block or sub-macroblock. Accordingly, each macroblock may be classified into multiple areas, and respective filter strength may be used for each area. While the iterative loop filter design leads to the best quality by selecting a loop filter among a set of candidates, the process suffers several drawbacks including extensive computations, increase bandwidth access and long processing latency. It is desirable to develop a system and method that can simplify the loop filter design process and reduce bandwidth associated with data access.

Therefore, loop filtering according to the present invention enables loop filtering on the reconstructed video data without the need to wait for the completion of the whole frame reconstruction and without the need for repeatedly trying out various loop filters to select a best one. Furthermore, when a reconstructed macroblock (MB) becomes available, loop filtering can be applied to the reconstructed MB. Nevertheless, a skilled person in the field may practice the present invention by buffering a small number of reconstructed macroblocks (MBs) while processing a current MB. Buffering a small number of MBs may relax the timing requirement for data access. On the other hand, buffering a small number of MBs still allows the system to benefit low encoding delay which is critical for many low-latency applications.

Figure 2:
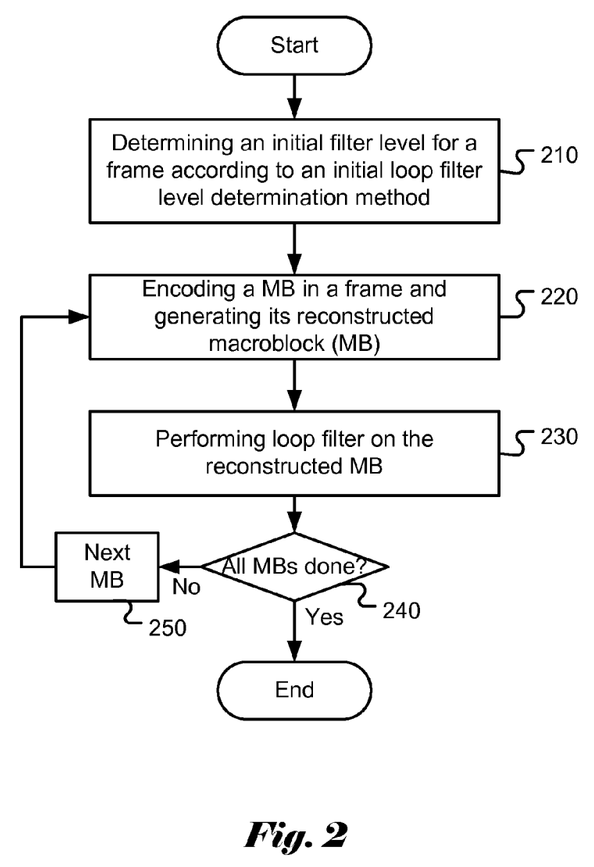
FIG. 2 illustrates an exemplary flow chart for an encoding system incorporating an embodiment according to the present invention, where the initial loop filter level is determined according to quality setting of the frame.

An exemplary flow chart for an encoding system incorporating an embodiment according to the present invention is shown in FIG. 2. The process starts with determining an initial filter level for a frame according to an initial loop filter level determination method as shown in block 210. Unlike the conventional method that requires iteratively testing each candidate filter before selecting a best one, the initial loop filter level determination method according to present invention does not require iterative procedure. The process then encodes a MB in the frame to generate a reconstructed MB as shown in block 220. Since the loop filtering according to present invention does not need to wait for all MBs in a frame being processed, and loop filtering can be applied to the reconstructed MB as shown in block 230. A test is performed in block 240 to determine whether all MBs are processed. If so, the process is terminated. Otherwise, an index is pointed to the next macroblock as shown in block 250 and the macroblock encoding in block 220 and macroblock loop filtering in block 230 are repeated. The exemplary flow chart shown in FIG. 2 is intended to illustrate one example to practice the present invention. The specific arrangement of the processing steps should not be construed as limitations to the present invention. A skilled person in the field may rearrange the processing steps and/or splitting/combining some steps to practice the present invention without departing from the spirit of the present invention.

Figure 3:
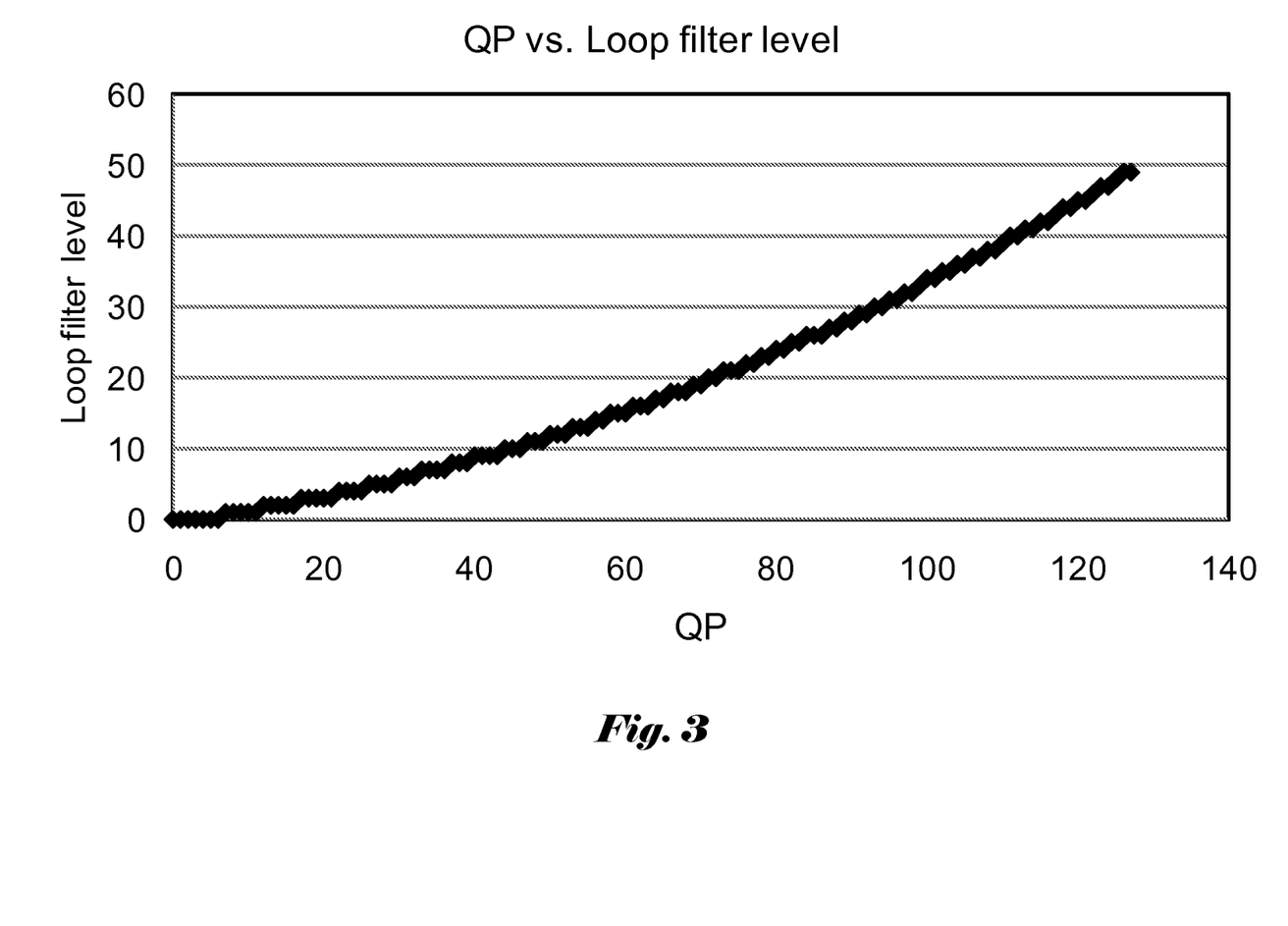
FIG. 3 illustrates an exemplary initial loop filter level determination according to quantization parameter (QP).

The initial loop filter level determination method incorporating an embodiment of the present invention is based on quality setting for the frame. The information associated with the initial loop filter level is incorporated in the bitstream so that a decoder may recover the initial loop filter level. The quality setting may be related to one or more system parameters such as quantization parameter (also called quantization factor), target bit rate per MB, target bit rate, frame width, frame height, and frame type such as referenceable, non-referenceable, golden or alt-frame as defined in VP8. When quantization factor (QP) is used for determining initial loop filter level, a larger loop filter level is selected for a larger QP value since a larger QP value often results in larger distortion. An exemplary relationship between loop filter level and QP value is illustrated in FIG. 3. The relationship between loop filter level and QP value can be implemented using a look-up table. The relationship between loop filter level and QP value shown in FIG. 3 is used as an example and shall not be construed as limitations to the present invention. A skilled person in the field may practice the present invention using similar relationship without departing from the spirit of the present invention. For example, the curve in FIG. 3 may be modified as a piece-wise linear function to practice the present invention. Furthermore, an encoding system incorporating an embodiment according to the present invention may start loop filtering once part of a frame is reconstructed in order to reduce required computations. For example, when one or more MBs are reconstructed, loop filtering can be applied to the MBs and the restored MBs can be stored in the frame buffer. The information associated with the initial loop filter level can be incorporated in the bitstream so that a decoder may perform the loop filtering accordingly. The information incorporated in the bitstream may comprise one or more loop filter parameters including filter_type, loop_filter level and sharpness_level.

Figure 4:
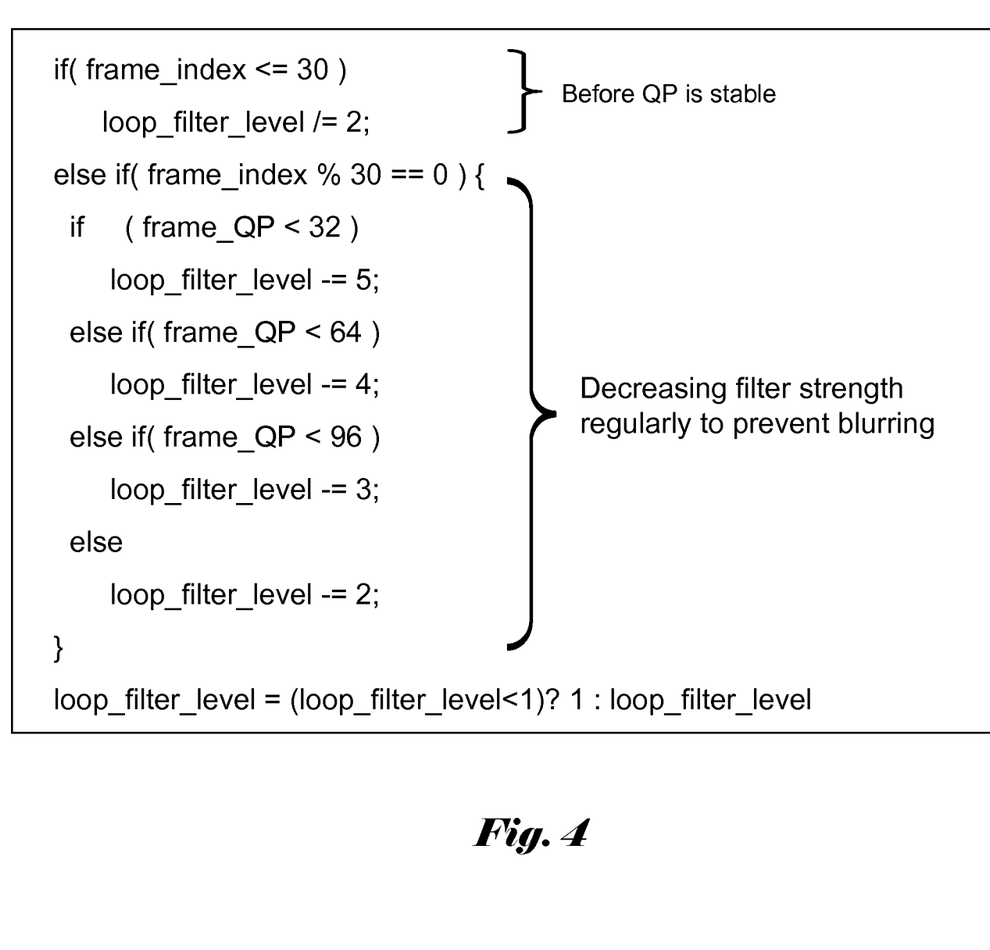
FIG. 4 illustrates exemplary pseudo codes incorporating an embodiment according to the present invention for adjusting initial loop filter level before the quality is stable and adjusting the initial loop filter level periodically afterward.

Since the present invention determines an initial loop filter level without the iterative filter selection process, the initial loop filter level selected at the beginning of a sequence may be unsettled. This potential problem may cause stability issue during encoding. The stability issue refers to large temporal variation of encoded information, such as unstable quantization parameter assigned by rate control mechanism in each frame. The stability issue also refers to the spatial and/or temporal variation of visual information associated with the video data. The visual information, for example, may be the pixel value or motion within the video sequence. In order to overcome this potential problem, an embodiment according to the present invention may reduce the initial loop filter level for a number of frames at the beginning of a sequence. After the initial frames, an embodiment according to the present invention may reduce the initial loop filter level once a while. For example, the encoding system may decrease the initial loop filter level once every 30 frames. Exemplary pseudo codes to implement the initial loop filter level reduction for initial frames of a sequence and periodic initial loop filter level reduction after the initial frames are shown in FIG. 4. In the example of FIG. 4, the initial loop filter level is reduced by half for the first 30 frames of the sequence. After the first 30 frames, the initial loop filter level is reduced once every 30 frames. For every $30^{th}$ frame, the example shown in FIG. 4 reduces loop filter level by 5 if QP is less than 32. If QP is greater than or equal to 32 and QP is less than 64, the loop filter level is reduced by 4. If QP is greater than or equal to 64 and QP is less than 96, the loop filter level is reduced by 3. Otherwise, the loop filter level is reduced by 2. The last line of the pseudo codes tests if QP is less than 1. If QP is less than 1, QP is set to 1. The example in FIG. 4 illustrates a particular implementation of frame-level initial loop filter level reduction and periodic frame-level initial loop filter level reduction. The particular numbers shown in the example, such as the number of initial frames, the number of periodic frames, and the QP intervals for loop filter level reduction, and the value of loop filter level reduction for each QP interval are for illustration purpose and shall not be construed as limitations of the present invention. Furthermore, an embodiment according to the present invention may either reduce loop filter level for initial frames or reduce loop filter level periodically, instead of incorporating both steps. A skilled person in the field may use other numbers to practice the present invention without departing from the spirit of the present invention.

Figure 5:
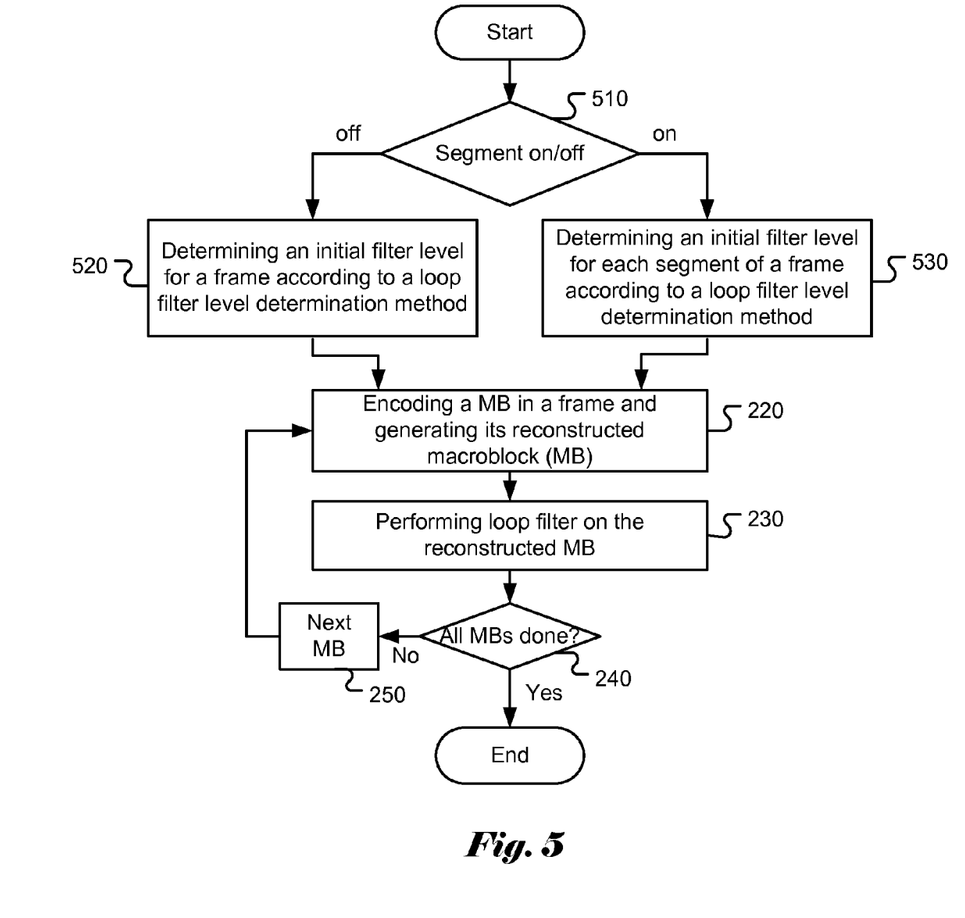
FIG. 5 illustrates an exemplary flow chart for an encoding system incorporating an embodiment according to the present invention, where the initial loop filter level may be determined adaptively according to quality setting for the frame or for the segment.
Figure 6:
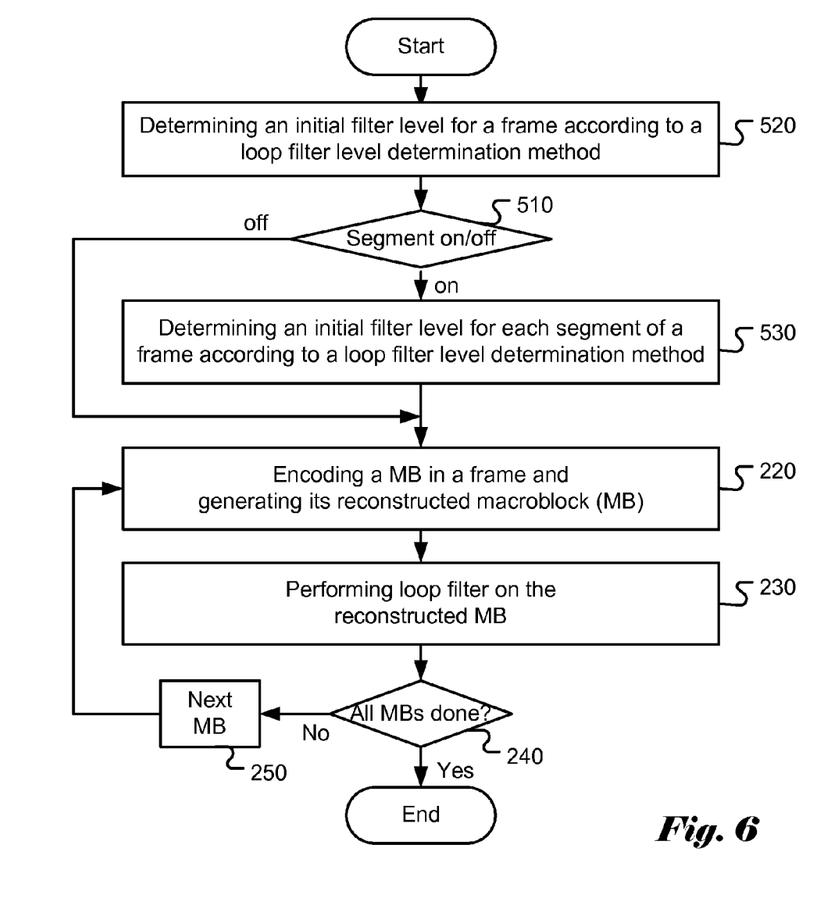
FIG. 6 illustrates another exemplary flow chart for an encoding system incorporating an embodiment according to the present invention, where the initial loop filter level may be determined adaptively according to quality setting for the frame or for the segment.

In another embodiment according to the present invention, the encoding system may select whether to determine the initial filter level for the frame or multiple segments of the frame. In the case that the initial filter level determination method selected is for the multiple segments of the frame, the frame is divided into multiple regions of interest (ROI), also called multiple segments in this disclosure. The initial filter level for each segment of the frame is determined according to the quality setting of the segment. Accordingly, each segment may have its own initial filter level. The segment-level initial filter level determination method enables more dynamic processing. Furthermore, additional segment-level initial filter level adjustment may be incorporated where the additional adjustment may depend on the segment characteristics, such as segmentation location, segmentation size, importance of the segment, or a combination of two or more the characteristics. FIG. 5 illustrates an exemplary flow chart for an encoding system incorporating an embodiment according to the present invention. A decision regarding whether the segment mode is on or off is made in block 510. If the segment mode is off, the encoding process moves to frame-based initial loop filter level determination in block 520. If the segment mode is on, the encoding process moves to segment-based initial loop filter level determination in block 530. After the initial loop filter level is determined for the frame or the initial loop filter levels for the segments of the frame are determined, the remaining process is similar to that of FIG. 2. FIG. 6 illustrates an alternative arrangement similar to FIG. 5, where the frame-based initial loop filter level is determined first in block 520. The test regarding whether segment mode is on or off is performed in block 510. If segment mode is off, the segment-based initial loop filter level determination in block 530 is skipped. Otherwise, the segment-based initial loop filter level determination is performed in block 530 and the frame-based initial loop filter level determined in block 520 is ignored or replaced by the segment-based initial loop filter level. After the initial loop filter level is determined for the frame or the initial loop filter levels for the segments of the frame are determined, the remaining process is similar to that of FIG. 2.

Embodiment of video encoding systems according to the present invention as described above may be implemented in various hardware, software codes, or a combination of both. For example, an embodiment of the present invention can be multiple processor circuits integrated into a video compression chip or program codes integrated into video compression software to perform the processing described herein. An embodiment of the present invention may also be program codes to be executed on a computer CPU having multiple CPU cores or Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware codes may be developed in different programming languages and different format or style. The software code may also be compiled for different target platform. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of encoding of video data, the method comprising:
   determining an initial loop filter level for a frame of the video data according to a factor associated with target bit rate, frame width and frame height, wherein the initial loop filter level is a loop filter parameter;
   incorporating loop filter information associated with the initial loop filter level in a bitstream corresponding to compressed video data;
   applying loop filtering to at least a part of reconstructed frame to generate restored video data; and
   providing the restored video data; wherein said determining the initial loop filter level determines at least one filter parameter selected from a group consisting of loop_filter_level and sharpness_level; and wherein a segment-level initial loop filter level is determined for each of segments of the frame according to quality setting for said each of the segments based on whether segmentation is on or off, and wherein the segment-level initial loop filter level is used as the initial loop filter level for said each of segments;
   wherein said determining the initial loop filter level determines at least one filter parameter selected from a group consisting of loop_filter_level and sharpness_level; and wherein a segment-level initial loop filter level is determined for each of segments of the frame according to quality setting for said each of the segments based on whether segmentation is on or off, and wherein the segment-level initial loop filter level is used as the initial loop filter level for said each of segments.

2. The method of claim 1, wherein said determining an initial loop filter level for a frame of the video data is further according to a frame type, and the frame type comprises referenceable frame type, non-referenceable frame type, golden frame type and alt-frame type.

3. The method of claim 1, wherein the loop filtering is applied to a reconstructed macroblock (MB) when a partial reconstructed frame including the macroblock is available.

4. The method of claim 1, wherein said loop filter information associated with the initial loop filter level comprises one or more filter parameters selected from a group consisting of filter_type, loop_filter_level, and sharpness_level.

5. A method of encoding of a video sequence, the method comprising:
   determining a frame-level initial loop filter level for a frame of the video sequence according to quality setting of the frame, wherein the frame-level initial loop filter level is used as initial loop filter level and the initial loop filter level is refined according to stability associated with the frame, and the frame-level initial loop filter level is a loop filter parameter, and wherein the frame-level initial loop filter level is changed from an initial value to an adjusted value for at least a first frame of the video sequence, the adjusted value is smaller than the initial value, and the video sequence begins with the first frame;
   incorporating loop filter information associated with the initial loop filter level in a bitstream corresponding to compressed video data;
   applying loop filtering to at least a part of reconstructed frame to generate restored video data; and
   providing the restored video data; wherein a segment-level initial loop filter level is determined for each of segments of the frame according to quality setting for said each of the segments based on whether segmentation is on or off, and wherein the segment-level initial loop filter level is used as the initial loop filter level for said each of segments;

wherein a segment-level initial loop filter level is determined for each of segments of the frame according to quality setting for said each of the segments based on whether segmentation is on or off, and wherein the segment-level initial loop filter level is used as the initial loop filter level for said each of segments.

6. The method of claim 5, wherein the initial loop filter level is determined according to one or more system parameters selected from a group consisting of quantization parameter (QP), target bit rate per macroblock (MB), target bit rate, frame width, frame height, and frame type.

7. The method of claim 6, wherein the initial loop filter level is determined according to quantization parameter (QP) using a look-up table associating the initial loop filter level with the QP.

8. The method of claim 5, wherein the stability is determined according to temporal variation of encoded information, spatial variation of visual information associated with the video sequence, temporal variation of the visual information associated with the video sequence, or a combination of the spatial variation and the temporal variation of the visual information associated with the video sequence.

9. The method of claim 5, wherein the frame-level initial loop filter level is periodically reduced after first N frames.

10. The method of claim 5, wherein the quality setting is related to one or more system parameters selected from a group consisting of quantization parameter (QP), target bit rate per macroblock (MB), target bit rate, frame width, frame height, and frame type.

11. A method of encoding of a video sequence, the method comprising:
  determining whether segmentation is on or off, wherein each segment determined by the segmentation is a region of a frame;
  if the segmentation is off:
    determining a frame-level initial loop filter level for the frame of the video sequence according to first quality setting of the frame, wherein the frame-level initial loop filter level is a loop filter parameter and is used as initial loop filter level;
  if the segmentation is on:
    dividing the frame into multiple segments; and
    determining a segment-level initial loop filter level for each of segments of the frame according to second quality setting for the segment, wherein the segment-level initial loop filter level is a loop filter parameter and is used as the initial loop filter level;
  incorporating loop filter information associated with the initial loop filter level in a bitstream corresponding to compressed video data;
  applying loop filtering to at least a part of reconstructed frame to generate restored video data; and
  providing the restored video data.

12. An apparatus for encoding of video data, the apparatus comprising:
  means for determining an initial loop filter level for a frame of the video data according to a factor associated with target bit rate, frame width and frame height, wherein the initial loop filter level is a loop filter parameter;
  means for incorporating loop filter information associated with the initial loop filter level in a bitstream corresponding to compressed video data;
  means for applying loop filtering to at least a part of reconstructed frame to generate restored video data; and
  means for providing the restored video data; wherein said means for determining the initial loop filter level determines at least one filter parameter selected from a group consisting of loop_filter_level and sharpness_level; and wherein a segment-level initial loop filter level is determined for each of segments of the frame according to quality setting for said each of the segments based on whether segmentation is on or off, and wherein the segment-level initial loop filter level is used as the initial loop filter level for said each of segments;
wherein said means for determining the initial loop filter level determines at least one filter parameter selected from a group consisting of loop filter level and sharpness_level; and wherein a segment-level initial loop filter level is determined for each of segments of the frame according to quality setting for said each of the segments based on whether segmentation is on or off, and wherein the segment-level initial loop filter level is used as the initial loop filter level for said each of segments.

13. The apparatus of claim 12, wherein the loop filtering is applied to a reconstructed macroblock (MB) when a partial reconstructed frame including the macroblock is available.

14. The apparatus of claim 12, wherein said loop filter information associated with the initial loop filter level comprises one or more filter parameters selected from a group consisting of filter_type, loop_filter_level, and sharpness_level.

15. An apparatus of encoding of a video sequence, the apparatus comprising:
  means for determining a frame-level initial loop filter level for a frame of the video sequence according to quality setting of the frame, wherein the frame-level initial loop filter level is used as initial loop filter level, the frame-level initial loop filter level is a loop filter parameter, and the initial loop filter level is refined according to stability associated with the frame, and wherein the frame-level initial loop filter level is changed from an initial value to an adjusted value for at least a first frame of the video sequence, the adjusted value is smaller than the initial value, and the video sequence begins with the first frame;
  means for incorporating loop filter information associated with the initial loop filter level in a bitstream corresponding to compressed video data;
  means for applying loop filtering to at least a part of reconstructed frame to generate restored video data; and
  means for providing the restored video data; wherein a segment-level initial loop filter level is determined for each of segments of the frame according to quality setting for said each of the segments based on whether segmentation is on or off, and wherein the segment-level initial loop filter level is used as the initial loop filter level for said each of segments;
wherein a segment-level initial loop filter level is determined for each of segments of the frame according to quality setting for said each of the segments based on whether segmentation is on or off, and wherein the segment-level initial loop filter level is used as the initial loop filter level for said each of segments.

16. The apparatus of claim 15, wherein the initial loop filter level is determined according to one or more system parameters selected from quantization parameter (QP), target bit rate per macroblock (MB), target bit rate, frame width, frame height, and frame type.

17. The apparatus of claim 16, wherein the initial loop filter level is determined according to quantization parameter (QP) using a look-up table associating the initial loop filter level with the QP.

18. The apparatus of claim 15, wherein the frame-level initial loop filter level is periodically reduced according to a range of the QP after first N frames.

19. The apparatus of claim 15, wherein the quality setting is related to one or more system parameters selected from a group consisting of quantization parameter (QP), target bit rate per macroblock (MB), target bit rate, frame width, frame height, and frame type.

20. The apparatus of claim 15, wherein the stability is determined according to temporal variation of encoded information, spatial variation of visual information associated with the video sequence, temporal variation of the visual information associated with the video sequence, or a combination of the spatial variation and the temporal variation of the visual information associated with the video sequence.

21. An apparatus of encoding of a video sequence, the apparatus comprising:

means for determining whether segmentation is on or off, wherein each segment determined by the segmentation is a region of a frame;

if the segmentation is off:

means for determining a frame-level initial loop filter level for the frame of the video sequence according to first quality setting of the frame, wherein the frame-level initial loop filter level is a loop filter parameter and is used as initial loop filter level;

means for determining a segment-level initial loop filter level for each of segments of the frame according to second quality setting for the segment if the segmentation is on, wherein the segment-level initial loop filter level is a loop filter parameter and is used as initial loop filter level;

if the segmentation is on:

means for dividing a frame into multiple segments; and         means for incorporating loop filter information associated with the initial loop filter level in a bitstream corresponding to compressed video data;

means for applying loop filtering to at least a part of reconstructed frame to generate restored video data; and     means for providing the restored video data.

\* \* \* \* \*